United States Patent [19]
Julien et al.

[11] Patent Number: 5,226,683
[45] Date of Patent: Jul. 13, 1993

[54] REUSABLE METALLIC SEAL USING MEMORY METAL

[76] Inventors: Gerald J. Julien, 11812 21st Ave. East, Puyallup, Wash. 98372; Steven P. Robinson, 9214 4th Ave. Northwest, Seattle, Wash. 98117; June L. Creson, P.O. Box 253, Graham, Wash. 98338

[21] Appl. No.: 614,715

[22] Filed: Nov. 16, 1990

[51] Int. Cl.⁵ .............................. F16L 17/06
[52] U.S. Cl. .................... 285/363; 285/381; 277/26; 277/189; 219/121.72
[58] Field of Search ............. 285/363, 381; 277/236, 277/1, 26; 219/121.63, 121.64, 121.67, 121.72; 228/170, 173.5

[56] References Cited
U.S. PATENT DOCUMENTS

| | | | |
|---|---|---|---|
| 3,759,552 | 9/1973 | Levinsohn et al. | 285/381 X |
| 3,938,235 | 2/1976 | Wandt, III et al. | 228/73.5 |
| 4,281,841 | 8/1981 | Kim et al. | 285/381 X |
| 4,477,087 | 10/1984 | Sutter et al. | 277/26 |
| 4,537,406 | 8/1985 | Hirasung et al. | 277/189 X |
| 4,773,680 | 9/1988 | Krumme | 285/381 |
| 5,015,820 | 5/1991 | Liou | 219/121.72 |

Primary Examiner—Dave W. Arola
Assistant Examiner—Heather Chan

[57] ABSTRACT

A metallic seal having a continuous annulus of Nitinol that is compressed between two seal faces and conforms to the minute irregularities of the seal faces to prevent leakage of fluid through those irregularities at extreme conditions of temperature, pressure and chemically reactive environments.

20 Claims, 5 Drawing Sheets

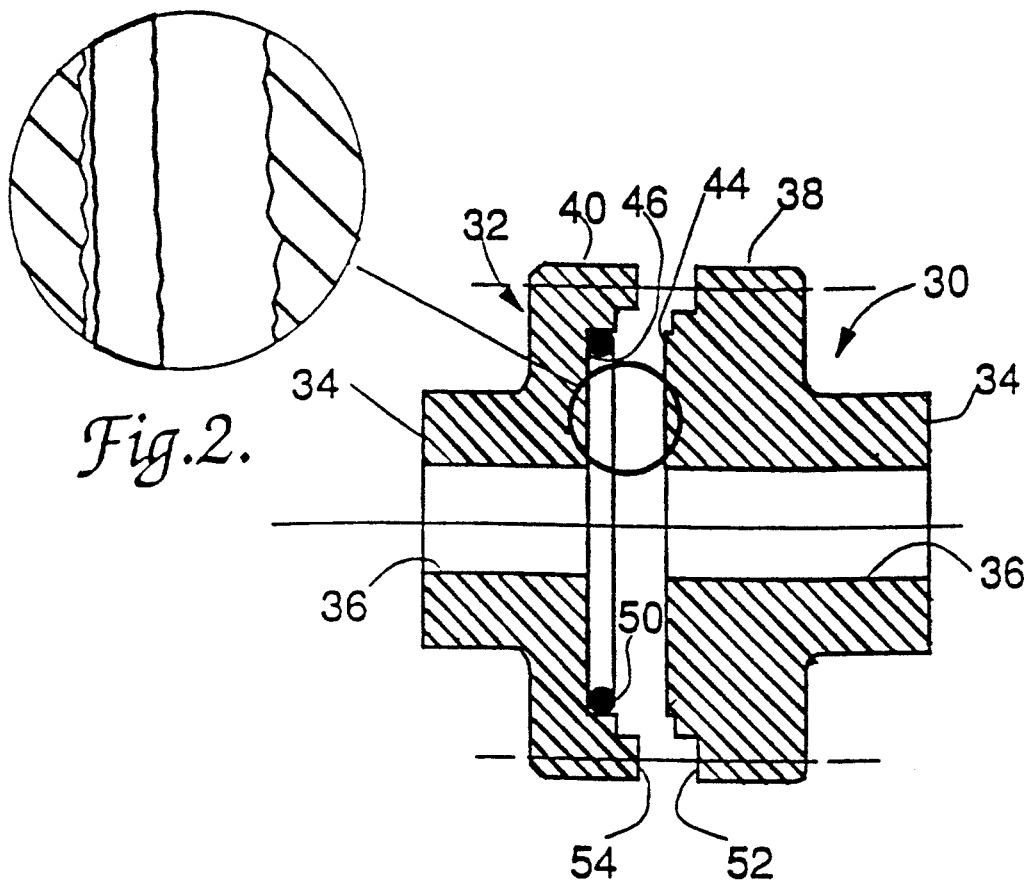
Fig.2.
Fig.1.
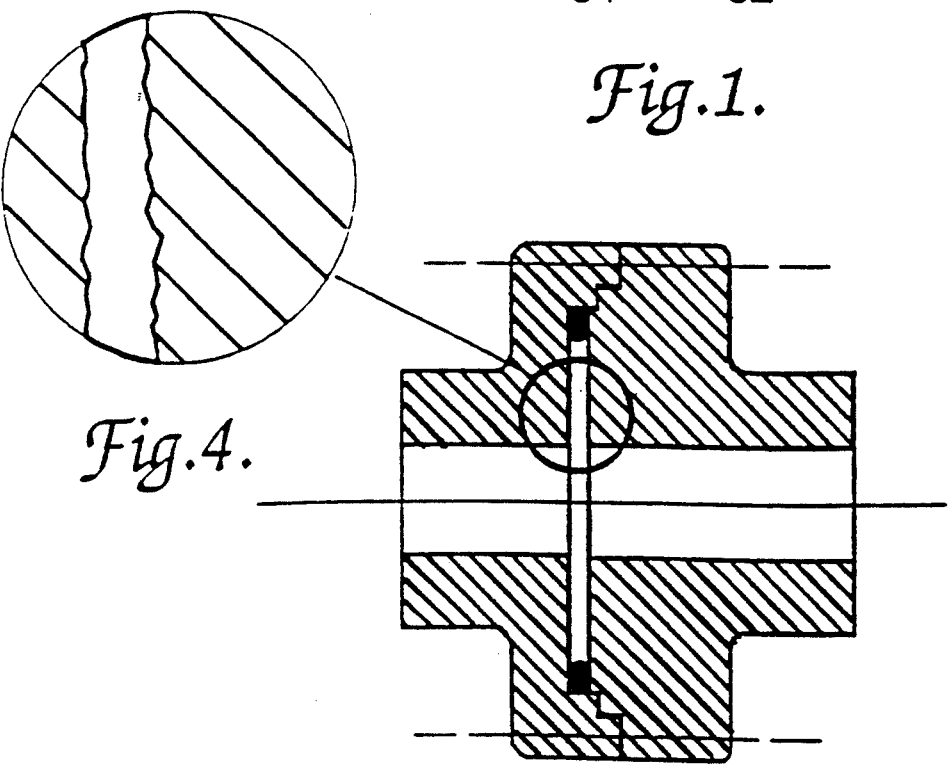
Fig.4.
Fig.3.

REUSABLE METALLIC SEAL USING MEMORY METAL

BACKGROUND OF THE INVENTION

This invention relates to reusable seals that are virtually perfectly leakproof at very high to very low pressures, very low (cryogenic) to very high (500° C.) temperatures, and in extremely hostile environments such as space or harsh, corrosive chemicals such as acids and other chemically reactive substances.

Conventional contact seal materials are generally of two different classes: metallic and non-metallic. The non-metallic seals are capable of excellent sealing at low cost over limited pressures and temperatures, and for a limited lifetime. However, they must be compatible with the fluid to be sealed and the environment the seal is in. The pressure, temperature and fluid compatibility issues are the greatest obstacles against using these seal materials.

Metallic seals are used to overcome the shortcomings of nonmetallic seals. However, conventional metallic seals, while allowing wider temperature and pressure capability than non-metallic seals, require a very smooth seal face against which to seal, and are susceptible to degradation caused by chemical incompatibility with the sealed fluid. Moveover, the permanent set induced in the metallic seal when it is deformed to make the seal makes this type of seal worthless for reuse.

Thus, there has long been a need in industry for a seal that remains effective over long periods of time regardless of temperature, pressure or the chemical environment, and which is economical for those reasons. This long sought seal would also have reduced need for extremely smooth machining of the seal faces and the close tolerances that have been necessary for good sealing surfaces for conventional seal materials, and would be capable of reused many times over and over again without any degradation in sealing effectiveness.

SUMMARY OF THE INVENTION

Accordingly, it is an object of this invention to provide a static seal for sealing an interface such as a coupling or the like, which can be reused many times without losing its sealing effectiveness.

It is another object of the invention to provide a static seal that can survive high temperatures and pressures and a severe chemical environment.

It is yet another object of the invention to provide a static seal that remains effective virtually indefinitely in sealing against leaks of fluid under high or low pressure.

It is still another object of the invention to provide a dynamic seal between relatively moving surfaces that can operate at high or low pressures, can survive hostile environmental environments, and is compatible with most fluids.

It is yet still another object of the invention to provide a seal that is insensitive to the surface finish of the sealing surfaces.

It is another object of the invention to provide a seal that provides a means to maintain the initial preload at the seal interface as the temperature changes.

These and other objects of the invention are attained in a continuous annulus of Nitinol that can be used like a conventional O-ring seal between two seal faces, and then can be reused after removal from the seal interface by heating the seal above its transition temperature to remove the surface indentations and irregularities, which returns it to its original shape and surface condition for reuse as a new seal.

DESCRIPTION OF THE DRAWINGS

The invention and its many attendant objects and advantages will become clear upon reading the following detailed description of the preferred embodiment in conjunction with the following drawings, wherein:

FIG. 1 is a cross-sectional elevation of two coupling members with a seal according to this invention at the seal interface between the coupling members;

FIG. 2 is an enlarged section of the seal and sealing surfaces of the coupling shown in FIG. 1, showing the surface irregularities of the sealing surfaces;

FIG. 3 is a cross-sectional elevation of the coupling shown in FIG. 1, with the coupling members clamped closed on the seal;

FIG. 4 is an enlarged section of the seal and the sealing surfaces of the coupling members shown in FIG. 3, showing the conformance of the seal with the surface irregularities in the sealing surfaces;

DESCRIPTION OF THE PREFERRED EMBODIMENTS

Figures 5, 5A:
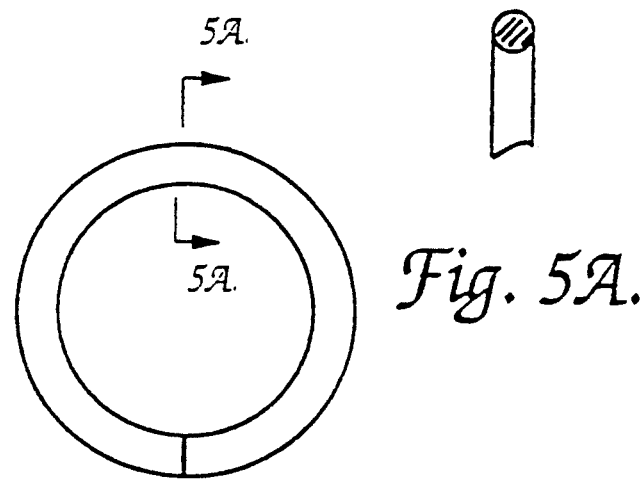
FIG. 5 is a plan view of one embodiment of a seal according to this invention.
FIG. 5A is a sectional elevation of a portion of the seal shown in FIG. 5.
Figures 6, 6A:
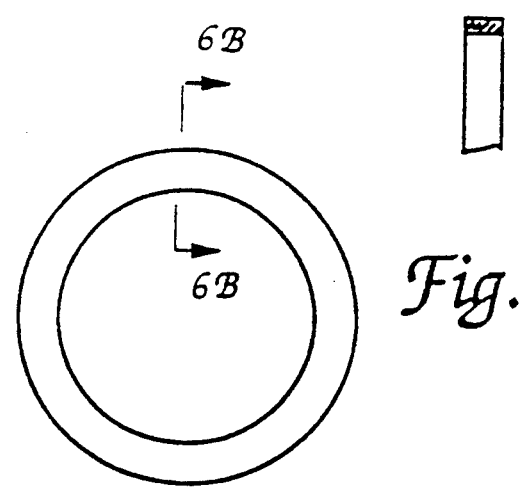
FIG. 6 is a plan view of a second embodiment of a seal according to this invention.
FIG. 6A is a sectional elevation of a section of the seal shown in FIG. 6.

Turning now to the drawings, wherein like reference characters designate identical or corresponding parts, and more particularly to FIG. 1 thereof, two members of a typical coupling for a fluid-tight system are shown, a male member 30 and a female member 32. Each member has a projecting distal portion 34 to which a fluid line (not shown) is connected by permanent secure means such as pressure fittings, silver solder or the like. A through bore 36 through each member 30 and 32 communicates with the fluid line when it is connected to the distal end 34 of the members. The proximal end of each member 30 and 32 is formed in a flange 38 and 40, respectively. Clamping means of conventional design (not shown) are provided in the usual manner for exerting a clamping force to hold the flanges 38 and 40 together under pressure.

The material of the coupling members 30 and 32 is typically a hard material that is immune to the chemical effects of the fluid that the fluid-tight system is to contain. A typical material for coupling members for use in a corrosive or other hostile chemical environment would be Inconel or stainless steel. The material should also have a yield strength greater than 100 KSI for a purpose which will become clear presently.

Each flange 30 and 32 has a sealing face 44 and 46 on its faying surface 52 and 54, respectively. The seal faces are typically flat, but there will always be some microscopic surface irregularities, shown (greatly enlarged for purposes of illustration) in FIG. 2. These irregularities would prevent the two sealing surfaces 44 and 46 from coming into intimate continuous contact across the entire surface of the seal faces because the material is too hard to deform sufficiently under the pressure exerted by the clamping means, so minute spaces would always exist between the two sealing faces 44 and 46 through which fluid under pressure could leak.

To fill the space between the hard sealing faces 44 and 46 and thereby establish a continuous region of material from face to face that will prevent the flow of fluid between the faces, the method of this invention interposes an O-ring 50 of memory metal such as Nitinol in its Martensitic state between the seal faces 44 and 46, and the flanges are then clamped together with sufficient force to deform the memory metal under the pressure exerted on the two flanges 38 and 40, such that the O-ring conforms to the surface topography of the seal surfaces 44 and 46 to fill all the surface irregularities in the sealing faces.

The Nitinol O-ring seal in the Martensitic state of the Nitinol has a yield strength of about 20-30 KSI whereas the material of the coupling members 30 and 32 is typically on the order of 100 KSI or higher. The coupling members are normally made of stainless steel or high strength steel, depending on the fluid that will be carried in the system in which they are to be used. The yield strength of the coupling members is substantially greater than the yield strength of the Nitinol O-ring seal, so that when the flanges of the mating coupling members are tightened together, as shown in FIGS. 3 and 4, it is the Nitinol that yields and conforms to the surface topography of the seal faces.

The faying surfaces 52 and 54 of the coupling members 30 and 32, respectively, abut the corresponding faying surface 54 and 52 of the coupling members 32 and 30, respectively, when the flanges 38 and 40 are clamped together. In this condition, the seal surfaces 44 and 46 are slightly separated as shown in FIG. 3, with a spacing less than the thickness of the seal 50 so the seal is deformed when the coupling members 30 and 32 are clamped together. The interference is about 5% to provide optimum conformance of the Nitinol with the surface irregularities of the sealing surfaces 44 and 46, but not enough strain in the Nitinol to cause it to undergo a permanent set or change state. This would not be detrimental to the sealing ability of the seal, but could adversely affect its ability to resume its original shape after heating to Austenitic state during the restoration step before reuse of the seal, as will be explained in detail below.

Memory metals of which the seal of this invention are made are materials that "remember" the shape they had when they were last formed in their Austenitic state. When the memory metal is transformed to its Martensitic state by reducing its temperature below the transition temperature, its yield strength drops substantially. It can be deformed relatively easily in its Martensitic state and conforms to the surface topography of the seal faces of the coupling members 30 and 32 readily under pressure exerted by the clamping members on the flanges 38 and 40. The most interesting property of memory metals is their "memory." When they are heated to a temperature above their transition temperature, the memory metal spontaneously reverts to the shape it had before it was deformed in the Martensitic state.

Nitinol is a type of memory metal made primarily from nickel and titanium. Nitinol is commercially available in various formulations to provide different characteristics, primarily various transition temperatures. One particularly attractive characteristic of Nitinol is its high corrosion resistance and resistance to hydrogen embrittlement. This feature makes Nitinol an excellent choice for a seal in fluid systems for fluids that are incompatible with common seal materials. Likewise, Nitinol seals are unaffected by temperatures in the deep cryogenic range, at which temperatures conventional seal materials would be brittle and crack. This feature is of great importance in cryogenic gas storage where the practical limits on such storage systems ar imposed by the pressure and temperature capabilities, and the associated working life, of the seals in the system.

Although a Nitinol seal will last indefinitely in a coupling, indeed as long or longer than the fluid system itself, it is the nature of fluid couplings that they are intended to be decoupled sometime in their life, sometimes frequently. Conventional metal seals can be used reliably only once and must be discarded when the coupling is opened. Memory metal seals according to this invention, on the other hand, can be restored to their original undeformed condition by heating them above their transition temperature, to their Austenitic state. At the transition temperature, the energy stored in the crystal structure of the material when it was deformed in the Martensitic state is released and the part spontaneously reverts to the shape it had before it was deformed. It can then simply be cooled back below its transition temperature and it is ready to be reused, in as good a condition as when it was new. Thus, the expense of using Nitinol seals in fluid systems can be significantly lower than conventional seals because, even though the initial cost of the seal itself may be higher than some other seals, the fact that it does not degrade with age and therefore does not need to be periodically replaced, and that it can be reused over and over again make it far more economical in terms of labor saved and additional procurement obviated.

One method of making the Nitinol seals according to this invention includes forming the Nitinol wire in a loop, and securing the ends of the loop together to form a continuous, uninterrupted annulus of precisely predetermined diameter and uniform thickness. The cut ends of the loop should have no burrs or distortion that would cause an irregularity in the annulus of the final seal, and the joint at the cut ends if the loop should have no chemical contamination that would cause the joint to behave differently from the main part of the annulus in operation or when the seal is heated above its transition temperature to restore it to its original shape after use.

Figure 7:
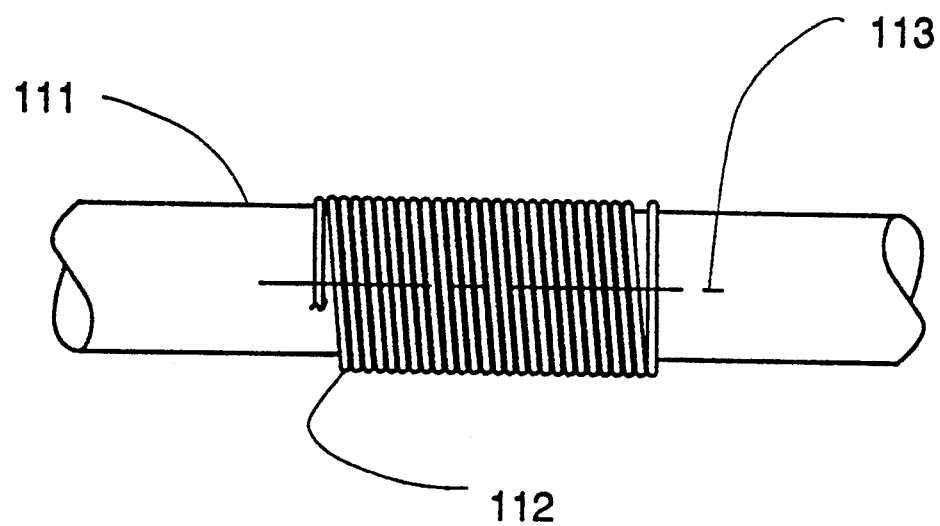
FIG. 7 an schematic elevation of a mandrel on which Nitinol wire can be wound to make Nitinol seals in mass production.
Figure 8:
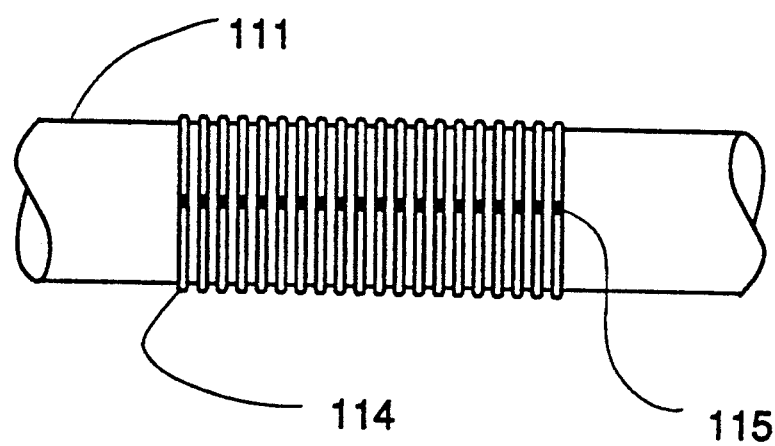
FIG. 8 is a schematic elevation of the mandrel in FIG. 7 with the Nitinol helix in the mandrel cut, shifted and welded to make a series of parallel rings of continuous Nitinol wire.

FIGS. 7 and 8 illustrate a method for forming these seals in mass production with the requirements given above. A long length of Nitinol wire is wrapped in a helix 112 around the length of a mandrel 111, and the helix 112 is cut longitudinally along a line 113 to sever each loop of the wire along the length of the mandrel by a single pass of a stressless cutter such as a laser beam, EDM head, or a water jet cutter having an abrasive in the cutting fluid. These cutting methods provide clean cut ends on the loops and no distortion or burrs that would have to be ground off the final product. The ends of the loops 114 are then aligned as shown in FIG. 8 by shifting the wound helix at the cut by one wire thickness, and the aligned ends of each loop is then welded with a laser to make a clean weldment that is close to the same diameter as the Nitinol wire, so no grinding is necessary.

Figure 9:
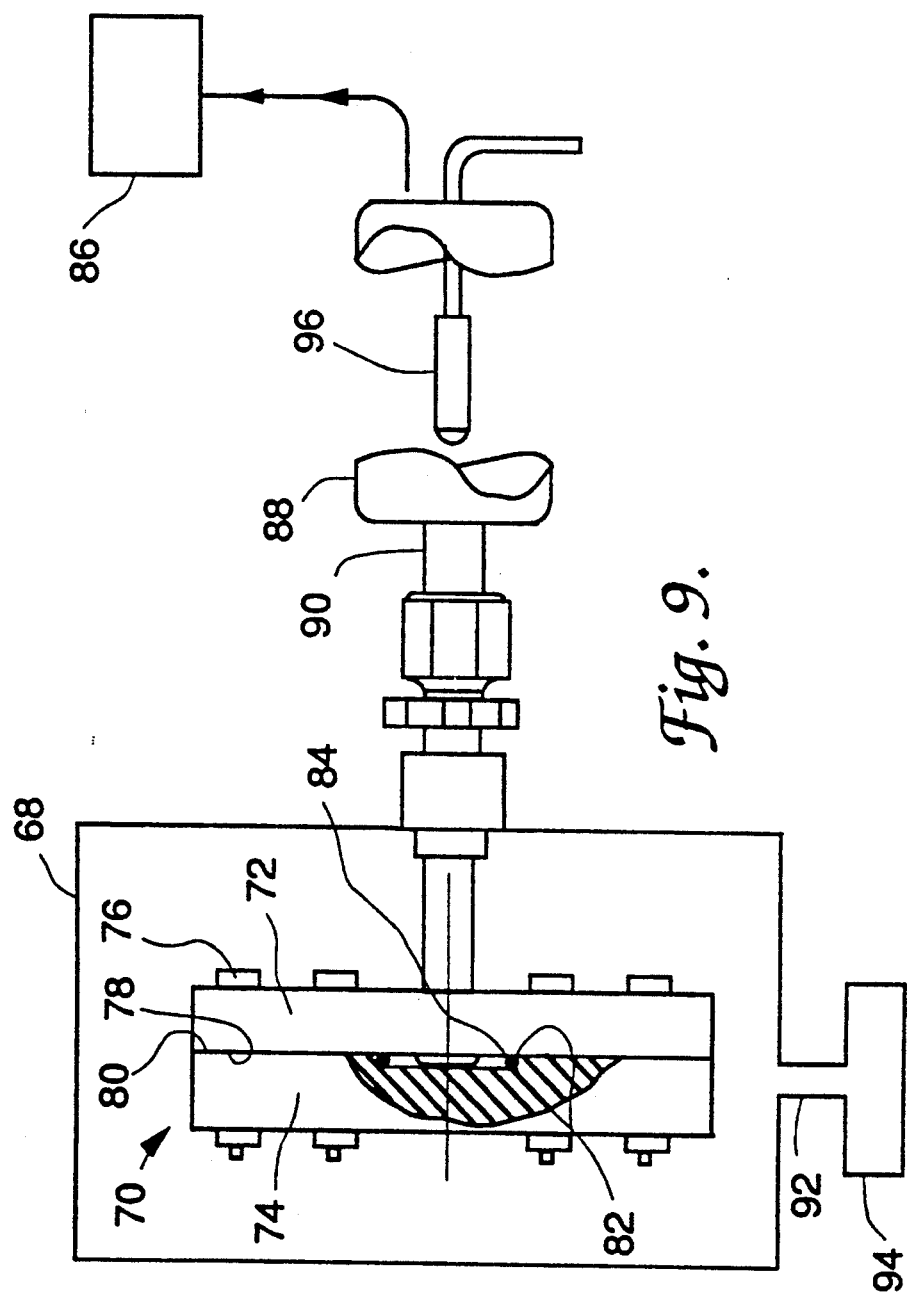
FIG. 9 is an elevation of a test configuration for testing the integrity of the seal provided by a seal as shown in FIG. 5.

The integrity of the seal provided by a Nitinol seal was tested in a test rig illustrated in FIG. 9. A "coupling" 70 having two seal members 72 and 74 is held together by six bolts 76, which function as "clamping members." The seal members 72 and 74 each has a faying surface 78 and 80, respectively, which is finished flat to serve as facing sealing surfaces of the seal members.

An annular groove 82 is machined in the sealing surface 80 of coupling member 74 to receive a circular Nitinol seal 84. The thickness of the Nitinol wire of the seal 84 is 0.062" and the depth of the groove 82 is 0.059" to provide an interference of 0.003" when the clamping members 76 are fully tightened down, causing a 5% strain in the Nitinol seal. This degree of strain is sufficient to compress the Nitinol into the microscopic surface irregularities in the sealing surfaces 78 and 80 of the coupling members to fill all the possible leak avenues that fluid could take to escape between the sealing surfaces on the coupling members 72 and 74.

To test the seal integrity, a vacuum is established in the center of the coupling 70 between the coupling members 72 and 4 within the seal 82. The vacuum is pulled by a vacuum pump 86 through a vacuum manifold 88 which is connected to the coupling 70 by a pipe system 90. Helium is sprayed into the test chamber 68 through a pipe 92 connected to a supply 94 of helium so that any leak in the seal 84 would draw helium into the center of the coupling and thence through the pipe system 90 into the vacuum manifold 88. A helium detector 96 in the vacuum manifold 88 would detect any helium within the sensitivity of the instrument.

The Nitinol seal was tested in the test rig shown in FIG. 9 to ascertain what rate of leakage would be observed at extreme vacuum. Helium leakage at less than $2 \times 10^{-10}$ cc/sec at room temperature was detected.

The Nitinol seal used in the test described above was a conventional formulation of 50% nickel and 50% titanium, and has a transition temperature of 85° C. To test the reusability of the seal, it was removed from the coupling 70 and heated above its transition temperature to restore it to is original shape and surface condition. It was then returned to the coupling, tightened in place and the helium leak test was rerun. The results were substantially identical, demonstrating that the seal did not suffer a degradation from being reused. Since the reusability feature is based on a crystalline transformation mechanism rather than a mechanical mechanism, no work hardening takes place that would limit the number of reuse cycles. It is expected, therefore, that the Nitinol seal will have an almost unlimited reusable life as long as the strain and temperature limitations are observed. Indeed, Nitinol has been subjected to more than $2 \times 10^8$ cycles without any apparent work hardening or reduction in physical properties.

The surface finish and flatness tolerance of the seal faces of the coupling need not be as smooth and fine as those of the couplings using a conventional seal. For example, a conventional coupling using a conventional metal O-ring seal would normally require a surface no rougher than 16 microinches for liquid and 8 microinches for gas. A conventional coupling using a conventional elastomeric seal would require a surface no rougher than 32 microinches for liquid, and 16 microinches for gas. The seal of this invention, on the other hand, can provide a near-zero leakage seal in a coupling having a surface finish of 100 microinches or greater. Because of the ability to conform to the surface topography and the very high surface pressure at the seal interface which the Nitinol can tolerate, the seal of this invention can provide superior leak resistance with a coupling that is manufactured with less demanding requirements, and hence which is more economical.

Figures 10, 10A:
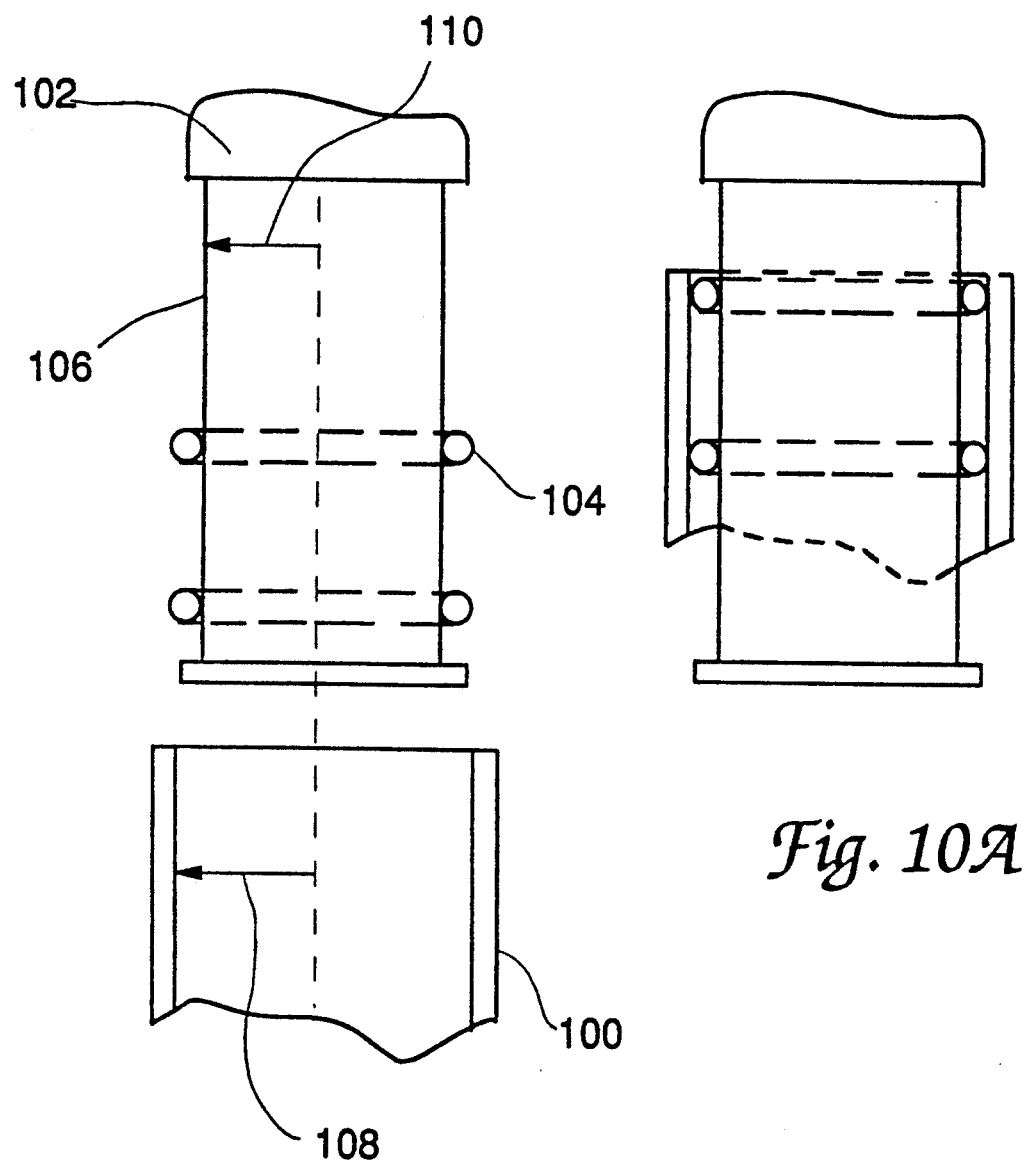
FIG. 10 is an exploded sectional elevation of a dynamic seal in accordance with this invention.
FIG. 10A is a sectional elevation of the dynamic seal installed between two relatively moving coupling members in accordance with this invention.

Turning now to FIG. 10, a dynamic seal is shown to prevent leakage of fluid between a housing 100 and an axially movable mating housing or shaft 102. At least one, and preferably several O-ring seals 104 are disposed on a reduced diameter section 106 of the shaft 102. The thickness of the seals 104 is slightly greater than the difference between the inside radius 108 of the housing 100 and the outside radius 110 of the shaft 102 so that the O-ring seals will be compressed about 2-5% when the shaft 102 is received within the housing 100.

In operation, the seal shown in FIG. 10 permits the shaft and the housing 100 to move relative to each other in the axial direction while the O-rings 104 roll on the shaft and the interior wall of the housing 100. The seal interface does not experience a sliding motion as in conventional dynamic seals, but instead the seal material is pressed against the seal faces of the shaft and the housing and conforms to the surface topography to fill and seal all the microscopic irregularities through which fluid could otherwise escape.

The material of the seals 104 is an Austenitic form of Nitinol known as Superelastic Nitinol. Superelastic Nitinol is made by extensive cold working of Austenitic Nitinol, such as drawing Austenitic Nitinol wire through a series of 50-80 ever smaller dies. The cold working transforms the Austenitic Nitinol to a highly elastic form of Austenitic Nitinol having a relatively high yield strength of about 80-90 KSI. This Superelastic Nitinol is ideal for dynamic seal applications because of its flexibility. This material can undergo an elastic deformation of over 7% without permanent set.

The Superelastic Nitinol can also be used in the couplings shown in FIGS. 1 and 9, but the coupling material must be fabricated from material with a yield strength of at least 100 KSI, so the coupling deforms the seal rather than being deformed by the seal. An advantage of using Superelastic Nitinol in these couplings is that it can be reused without heating to restore it to its original shape and surface condition. The Superelastic Nitinol seal, when squeezed to a 5-8% strain in the seal interface, deforms elastically rather than plasticly like the seal shown in FIG. 1, so that it springs back elastically to its original shape and surface condition when it is removed from the coupling, and is immediately ready for reuse.

The Nitinol seals can be used in very high temperature applications and its high temperature capabilities make it ideal for such applications. Indeed, the seal of this invention makes it possible to provide take-apart couplings in high temperature applications that always in the past have required hard connections that required cutting to open a line to remove a component or the like. However, in these applications the seal will take a permanent set then the temperature goes above the transition point while the seal is in place. The seal will continue to function as well as it did below the transition point, but the material will be transformed to the Austenitic state and the "memory" of the original shape will be lost. The seal in this application will remain effective above the maximum temperature of most systems, up to about 1000° C.

Thus, a seal has been described that can be reused indefinitely and each time provides a virtually perfect seal, able to remain effective at low temperatures and at very high or very low pressures. The inert nature of the seal material makes it immune to the deleterious effects of corrosive and other reactive fluids and chemical environments. This seal provides an effective seal in economical couplings that are manufactured to less demanding conditions of surface finish and flatness tolerance, and by reason of its low CTE, maintains the preload on the seal during temperature changes.

Obviously, numerous modifications and variations of the preferred embodiment disclosed herein will occur to those skilled in the art in light of this disclosure.

Accordingly, it is expressly to be understood that these modifications and variations, and the equivalents thereof, may be practiced while remaining within the spirit and scope of the invention as defined in the claims, wherein we claim:

1. A fluid seal, comprising:
   a continuous annulus of binary memory metal having a relatively soft martensitic state and a relatively hard austenitic state, said annulus existing in said martensitic state, whereby said seal annulus can be deformed when compressed between two mating seal surfaces and will conform to the surface irregularities of said seal surfaces to effect a fluid-tight seal, and said seal annulus can be removed and heated above a transition temperature to said austenitic state to be restored to the original undeformed condition which it had prior to deformation between said mating seal surfaces.

2. A fluid seal as defined in claim 1, wherein:
   said memory metal is Nitinol.

3. A fluid seal as defined in claim 1, wherein:
   said memory metal is binary Nitinol in its Martensitic state.

4. A fluid seal as defined in claim 1, wherein:
   said memory metal is Nitinol, and
   said annulus is a full loop of Nitinol wire, laser welded at abutting ends of said loop.

5. A fluid seal, comprising
   a continuous annulus of Superelastic Nitinol memory metal.

6. A method of forming a fluid tight seal at a coupling in a system for conveying fluids under pressure, said coupling having two seal members, each of which has a seal face and a flange for receipt of clamping members for exerting pressure on a seal disposed between said seal faces, said method comprising:
   inserting a seal, having a continuous annulus of binary memory metal in a martensitic state, between said seal faces; and
   tightening said clamping members to exert sufficient force on said annulus to deform said memory metal in said martensitic state so that it conforms to the surface topography of said seal faces and forms a substantially continuous metal interface between said seal faces in intimate contact therewith, leaving no avenue for passage of fluid between said faces.

7. A method as defined in claim 6, further comprising:
   clamping said seal between said seal faces with a pressure greater than the intrinsic restoring pressure of said memory metal when it undergoes a temperature induced change of state from the martensitic to austenitic state; and
   raising the temperature of said seal while maintaining said pressure on said seal;
   whereby use of said seal in a high temperature application results in a change of state of said memory metal from said martensitic state to the austenitic state, and the microscopic surface irregularities in said seal impressed by said mating seal faces become permanent, although the seal remains in intimate metal contact with said seal faces, leaving no avenues for escape of fluid under pressure between said seal faces.

8. A method as defined in claim 6, further comprising:
   maintaining said seal in said martensitic state while said seal is in said coupling, whereby said seal may be removed from said coupling and heated to restore said seal to the surface condition and shape it had prior to insertion in said coupling.

9. A method of forming a fluid tight seal at a coupling in a system for conveying fluids under pressure, said coupling having two seal members, each of which has a seal face and a flange for receipt of clamping members for exerting pressure on a seal disposed between said seal faces, said method comprising:
   inserting a seal, having a continuous annulus of memory metal, between said seal faces;
   tightening said clamping members to exert sufficient force on said annulus to deform said memory metal so that it conforms to the surface topography of said seal faces and forms a substantially continuous metal interface between said seal faces in intimate contact therewith, leaving no avenue for passage of fluid between said faces;
   removing said seal from said coupling;
   heating said seal to a temperature above the transition temperature of said memory metal to restore said seal to its configuration before being deformed between said seal faces; and
   reinserting said seal between the seal faces of the same or another coupling; and
   tightening clamping pressure on the flanges on said same or other coupling with sufficient force to deform said seal so that it conforms to the surface topography of the seal faces on said same or other coupling to seal all avenues of leakage of said fluid in the same manner as aforesaid.

10. A fluid tight coupling in a system for conveying fluid under pressure, comprising:
    two seal members, each having a seal face and a flange;
    clamping means bearing on each of said flanges and exerting a force tending to squeeze said flanges together;
    a seal disposed between said seal faces of said seal members, said seal having a continuous annulus of binary memory metal in a relatively soft martensitic state;
    whereby said seal is deformed in said martensitic state by said seal faces under said clamping force and conforms intimately to the surface topography of said seal faces to effect a fluid tight seal between said faces.

11. A fluid tight coupling as defined in claim 8, wherein:
said memory metal is binary Nitinol in its Martensitic state.

12. A fluid tight coupling as defined in claim 8, wherein:
said seal is a loop of Nitinol wire which has been laser welded at the ends of the loop to form a continuous annulus.

13. A fluid tight coupling as defined in claim 10, wherein:
said seal has a relatively hard austenitic state which said memory spontaneously reverts to when raised in temperature above a transition temperature of said memory metal, and upon reverting to said austenitic state, said seal spontaneously returns to the shape it had prior to deformation in said martensitic state between said seal faces;
whereby said seal can be removed from said coupling after deformation between said seal faces and can be heated to a temperature above said transition temperature, whereupon said deformation in said seal impressed by said seal faces will spontaneously disappear and said seal will be restored to the shape it had prior to deformation by said seal faces.

14. A fluid tight coupling as defined in claim 10, wherein:
said seal faces have a relatively rough surface finish of between 16-100 microinches, and said coupling provides a fluid tight seal by said seal conforming to the relatively large surface irregularities in said relatively rough finish of said seal faces.

15. A fluid tight seal as defined in claim 10, wherein:
said seal faces are made of a material having a yield strength in excess of 100 KSI, and said seal is made of Nitinol having a yield strength in the martensitic state thereof of less than 40 KSI;
whereby said seal is so much softer than said seal faces that said seal is deformed by said seal faces, and said seal faces are undeformed by said seal when said clamping means squeezes said seal between said seal faces.

16. A fluid tight seal as defined in claim 10, wherein:
said seal has a lower coefficient of thermal expansion than said seal members;
whereby said seal maintains the initial preload between said seal elements as the temperature of said coupling decreases, thereby enhancing sealing effectiveness regardless of cryogenic thermal shock.

17. A method of making a fluid seal, comprising:
forming a length of Nitinol wire into a loop by wrapping said Nitinol wire around a mandrel and cutting said wire with a stressless cutter;
aligning and abutting the ends of said Nitinol wire loop; and
laser welding the abutting ends of said loop together to form a continuous annulus of Nitinol.

18. A method as defined in claim 17, wherein:
said forming step includes wrapping said Nitinol wire around a mandrel and cutting said wire so that the ends if said wire abut against each other; and
said laser welding step includes welding said ends of said wire together while said wire loop is still on said mandrel.

19. A method as defined in claim 17, wherein:
said forming step includes wrapping a long length of wire in a helix of multiple turns around a mandrel, and cutting each of said turns in a line along the length of said mandrel;
said aligning step includes shifting said helix on one side of said cut in the direction of the axis of said helix a distance equal to the thickness of one wire to align the ends of said turns of wire in a series of parallel loops;
welding each of said aligned ends together with a pass of a laser welder along said cut lines; and
removing said welded loops from said mandrel.

20. A fluid tight coupling in a system for conveying fluid under pressure, comprising:
two seal members, each having a seal face and a flange;
clamping means bearing on each of said flanges and exerting a force tending to squeeze said flanges together;
a seal disposed between said seal faces of said seal members, said seal having a continuous annulus of Superelastic Nitinol memory metal.

* * * * *